US006978641B2

(12) United States Patent
Sugiyama et al.

(10) Patent No.: US 6,978,641 B2
(45) Date of Patent: Dec. 27, 2005

(54) METHOD FOR CUTTING GLASS ROD AND CUTTING DEVICE FOR USE THEREIN

(75) Inventors: Takashi Sugiyama, Tochigi (JP); Toshimi Habasaki, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/474,823

(22) PCT Filed: Nov. 22, 2001

(86) PCT No.: PCT/JP01/10224

§ 371 (c)(1),
(2), (4) Date: Oct. 15, 2003

(87) PCT Pub. No.: WO02/085804

PCT Pub. Date: Oct. 31, 2002

(65) Prior Publication Data

US 2004/0129027 A1 Jul. 8, 2004

(30) Foreign Application Priority Data

Apr. 16, 2001 (JP) ............................ 2001-117086

(51) Int. Cl.[7] ......................... C03B 21/00; C03B 23/00

(52) U.S. Cl. ............................ 65/105; 65/112; 65/113; 65/271; 65/374; 65/433

(58) Field of Search .......................... 65/105, 112, 113, 65/271, 374, 433

(56) References Cited

U.S. PATENT DOCUMENTS 5,979,189 A * 11/1999 Campion et al. ............. 65/391
6,196,028 B1 * 3/2001 Humbert et al. .............. 65/483

FOREIGN PATENT DOCUMENTS

EP 0 999 189 A1 5/2000
JP 54-43914 4/1979

* cited by examiner

*Primary Examiner*—Mark Halpem
(74) *Attorney, Agent, or Firm*—McDermott Will & Emery LLP

(57) ABSTRACT

To provide a method and apparatus for parting a glass rod without causing a crack or rupture at a grasped root portion of the glass rod in parting the glass rod for producing a glass preform.

The apparatus for parting the glass rod in a predetermined length by grasping both ends of the glass rod 11 is characterized by comprising a supporting unit 18 of Y-character shape for supporting an intermediate position between both ends of the glass rod 11 from the lower part, the supporting unit 18 having a carbon sleeve composed of a cylindrical body that is rotatable around each of two leg portions making up a forked leg portion as an axis, the carbon sleeve being rotatable along with an axial movement of the glass rod.

16 Claims, 3 Drawing Sheets

14
16
11b
11a
11
16
12
15
17
18
16a
13

METHOD FOR CUTTING GLASS ROD AND CUTTING DEVICE FOR USE THEREIN

This application is a 371 of PCT/JP01/10224 filed Nov. 22, 2001.

TECHNICAL FIELD

The present invention relates to a method for parting a glass rod and an apparatus for use with this method, and more particularly to a glass rod supporting method and apparatus for parting a long glass rod that is a starting material for producing a glass preform, for example, a glass preform for optical fiber, in such a manner that it is attached and secured to a lathe machine.

BACKGROUND ART

Along with the developments of the optical fiber communications in recent years, there is an increasing demand for a glass optical fiber, and it is demanded to reduce the cost of the glass optical fiber. In this situation, it is required to increase the productivity of the glass optical fiber, and enhance the production efficiency. Therefore, it has been examined to increase the dimensions of the optical fiber glass preform and enhance the mass productivity.

A method for manufacturing the glass preform for optical fiber is well known in which a porous glass is produced by a VAD method (Vapor phase Axial Deposition method), and the porous glass is, for example, dehydrated, consolidated and vitrified. This VAD method involves injecting a glass material and a flame gas from a burner and depositing glass particles on a rotating quartz glass rod in an axial direction. And the porous glass formed by depositing glass particles is dehydrated, consolidated, vitrified, and drawn to produce a glass preform like the rod. Then, glass particles are further deposited on the outside of the glass preform like the rod to form a porous glass and then obtain a glass preform having a predetermined outer diameter.

In manufacturing the glass preform for optical fiber having a predetermined outer diameter, a quartz glass or a vitrified drawn glass is employed for the glass rod as the starting material for use in depositing the glass particles. The glass rod of the starting material has a different length depending on the dimensions of the glass preform to be produced, and if there is any abnormal part in the glass rod, it is required to remove the abnormal part.

Therefore, the long glass rod is parted in a predetermined length to obtain the glass rod having a length according to the glass preform to be produced, using the lathe machine.

FIG. 5 shows a conventional parting apparatus for parting the glass rod in a predetermined length. In the drawing, 1 is a glass rod, 2 is a lathe machine, 3 is a base board, 4 is a fixed supporter, 5 is a movable supporter, 6 is a chuck, and 7 is a glass burner. This apparatus is constituted such that one end portion of the glass rod 1 is grasped by the chuck 6 of the fixed supporter 4, and the other end portion is grasped by the chuck 6 of the movable supporter 5, as shown in FIG. 5.

And the movable supporter 5 is disposed so that its position can be adjusted on the base board 3 so as to correspond to a length of the glass rod 1. Also, the chuck 6 is rotatable with respect to the supporters 4, 5 and grasps the glass rod 1 rotatably.

The glass rod 1 with both ends grasped by the chucks 6 is rotated by rotation driving means (not shown), and heated and fused uniformly at a predetermined parting position by the glass burner 7.

Thereafter, the movable supporter 5 is moved to break a softened part that is heated and fused to part the glass rod 1 into two. Half pieces of the glass rod 1 parted into two are grasped in cantilever fashion by the chucks 6 respectively, but a stress concentrates on a grasped part of the glass rod 1. If the glass rod 1 is shorter, the stress is smaller, and the glass rod 1 is grasped in cantilever fashion without causing any problem.

However, when the glass rod 1 is longer, it is increased in weight, so that a larger stress in cantilever fashion causes a crack in the grasped part of the glass rod 1, possibly leading to a rupture.

SUMMARY OF THE INVENTION

The present invention has been achieved in the light of the above-mentioned problems, and it is an object of the invention to provide a method for supporting a glass rod without causing a crack or rupture at a grasped root portion of the glass rod in parting the glass rod for producing a glass preform into a predetermined length, and a parting apparatus for use with this method.

The present invention provides a method for parting a glass rod, characterized by parting the glass rod while supporting the glass rod at a predetermined position between both ends of the glass rod from the lower part by means of a supporting unit, which is disposed so that its position can be adjusted, in parting the glass rod in a predetermined length while grasping the both ends of the glass rod.

Also, the invention provides an apparatus for parting a glass rod by parting the glass rod in a predetermined length while grasping both ends of the glass rod, characterized by comprising grasping means for grasping both ends of the glass rod with a supporting unit for supporting an intermediate position between both ends of the glass rod from the lower part, the supporting unit for supporting the glass rod at at least two points, the position of the supporting unit being adjustable in a longitudinal direction of the glass rod, and parting means for parting the glass rod while heating it.

In the figures, 11 is a glass rod, 12 is a lathe machine, 13 is a base board, 14 is a fixed supporter, 15 is a movable supporter, 16 is a chuck, 17 is a glass burner, and 18 is a supporting unit.

BEST MODE FOR CARRYING OUT THE INVENTION

Figure 1:
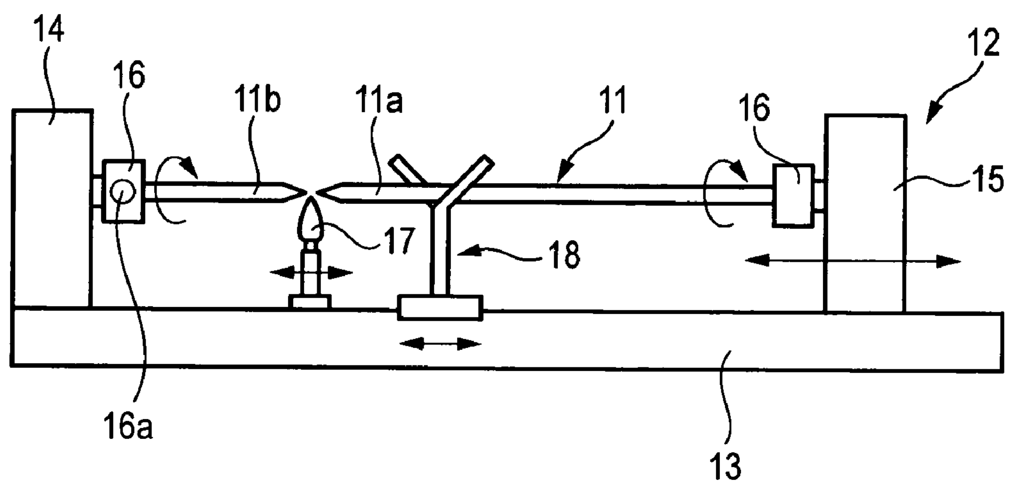
FIG. 1 is a view for explaining an embodiment of the present invention.
Figure 2:
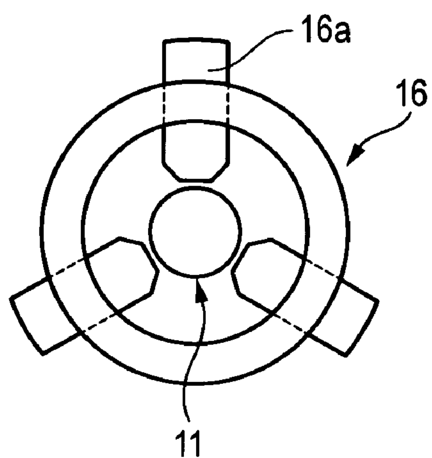
FIG. 2 is a view showing a chuck portion for grasping an end portion of a glass rod.
Figure 3:
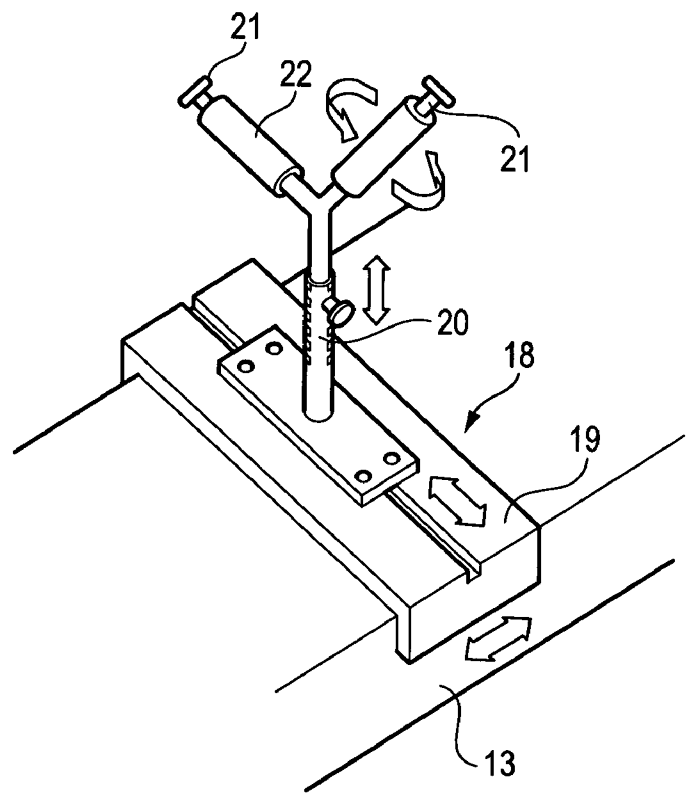
FIG. 3 is a view showing a supporting unit according to the invention.

The preferred embodiments of the present invention will be described below with reference to the accompanying drawings. FIG. 1 is a schematic view for explaining a method for parting a glass rod according to the invention. FIG. 2 is a view showing a chuck portion of the glass rod. FIG. 3 is a view showing a supporting unit of Y-character shape. In FIG. 1, 11 is a glass rod, 12 is a lathe machine, 13 is a base board, 14 is a fixed supporter, 15 is a movable supporter, 16 is a chuck, 17 is a glass burner, and 18 is a supporting unit.

The lathe machine 12 comprises the fixed supporter 14, the movable supporter 15 and the supporting unit 18 which support the glass rod 11 on the base board 13, and the glass burner 17 for parting the glass rod 11.

The fixed supporter 14 may be made movable, like the movable supporter 15. The movable supporter 15 and the supporting unit 18 are disposed such that they may be adjustable in position in a longitudinal direction of the base board, using a guide rail. The fixed supporter 14 and the movable supporter 15 are provided with the chucks 16 for grasping the glass rod 1. The glass burner 17 may be an oxyhydrogen flame burner having five to seven burner openings for heating about one-half of the glass rod in a circumferential direction.

The glass rod 11 has a length of 3 m and a diameter of 0.03 m, for example, and is formed of quartz or glass having a dopant added in the central portion. This glass rod 11 is parted into a length of about 2 m, for example, and employed as a base material for forming a large porous glass preform by depositing glass particles on an outer peripheral face in producing the glass preform.

The glass rod 11 may be also employed as a seed rod for depositing glass particles in the axial direction by the VAD method, or a dummy rod in an elongation process of the transparent glass.

The glass rod 11 is mounted on the lathe machine 12 to part it into a predetermined length according to the dimension of the glass preform to be produced. The glass rod 11 is mounted on the lathe machine 12 in such a manner that one end portion of the glass rod 11 is grasped by the chuck 16 of the fixed supporter 14, and the other end portion is grasped by the chuck 16 of the movable supporter 15. The supporting unit 18 is positioned at a glass rod 11*a* to be parted longer near the parting position, and adjusted in height to support the glass rod.

The chuck 16 grasps the glass rod 11 with at least three adjusting shafts 16*a* for centering an end portion of the glass rod 11, as shown in FIG. 2. Also, the chuck 16 is made rotatable by rotation driving means (not shown), and rotates the glass rod 11 to heat and fuse the glass rod 11 uniformly around the entire circumference of the parting part using the glass burner 17. Thereafter, the movable supporter 15 is moved to break a softened part that is heated and fused to part the glass rod 1 into two.

When the glass rod 11 is parted in a predetermined length, the parted glass rods 11*a* and 11*b* are cantilevered at one ends. A shorter glass rod 11*b* is grasped in cantilever fashion without problem in respect of the load, while the root of a longer glass rod 11*a* which is grasped by the chuck 16 is abruptly subjected to a large bending moment. Therefore, there is a fear that the glass rod 11*a* has a crack or rupture due to the grasped portion. However, in this invention, the supporting unit 18 is disposed near the parting part of the longer glass rod 11*a*, so that the parted glass rod 11*a* is supported at two points to avoid concentration of stress on the grasped portion. Consequently, it is possible to prevent a crack or rupture from occurring.

The supporting unit 18 is attached so that its disposed position may be adjustable by sliding in the longitudinal direction of the base board 13 in the lathe machine 12, as shown in FIG. 3. The supporting unit 18 consists of a strut 20 of Y-character shape that is mounted on a pedestal portion 19 and a forked leg portion 21 at the upper part of the strut on which a sleeve 22 made of carbon is disposed rotatably. The strut 20 is formed, for example, in a telescopical shape to allow the adjustment of the height position, and attached to allow the adjustment of the position in a lateral direction of the pedestal portion 19.

Accordingly, the strut 20 of the support 18 is adjustable in position in three directions, including longitudinal of the lathe machine 12, transverse and height directions.

The glass rod 11 is centered by the forked leg portion 21 of Y-character shape, and owing to a cylindrical sleeve 22 being rotatable around each of the leg portions as the axis, the glass rod 11 is smoothly supported without obstructing the axial movement of the glass rod 11, because the sleeve 22 is rotated along with the axial movement of the glass rod 11.

Since the sleeve 22 is formed of carbon, the glass rod 11 can be subjected to a fire polish, even if carbon of the sleeve 22 sticks to the glass rod, whereby no impurities are left on the surface.

As described above, the glass rod is supported at two points where a free end portion of the longer glass rod 11*a* parted is supported by the supporting unit 18 of Y-character shape disposed in an intermediate part of the lathe machine 12, so that it is possible to prevent a stress from concentrating on a portion grasped by the chuck 16.

Though with the conventional method, the crack or rupture occurred at a rate of one per 6.4, the occurrence of crack or rupture is eliminated, employing the supporting unit 18 of this invention.

In parting, when the glass rod 11 is mounted on the lathe machine 12, the load of the glass rod 11 is distributed because of the supporting unit 18 that is disposed intermediately, whereby the mounting operation is facilitated.

Since this supporting unit 18 supports the glass rod stably at two points of the two leg portions shaped like the Y-character, the glass rod 11 is supported stably, even if the glass rod is moved in the axial direction in parting.

Figure 4:
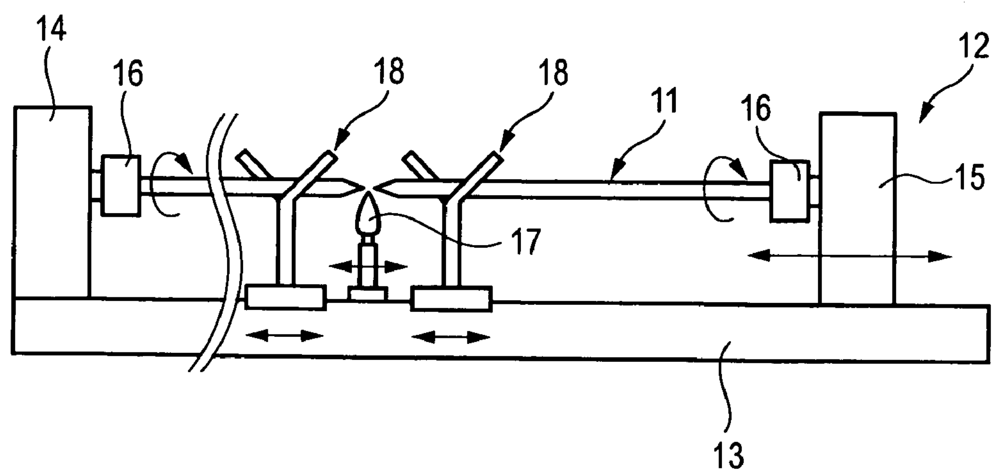
FIG. 4 is a view showing another embodiment of the invention.
Figure 5:
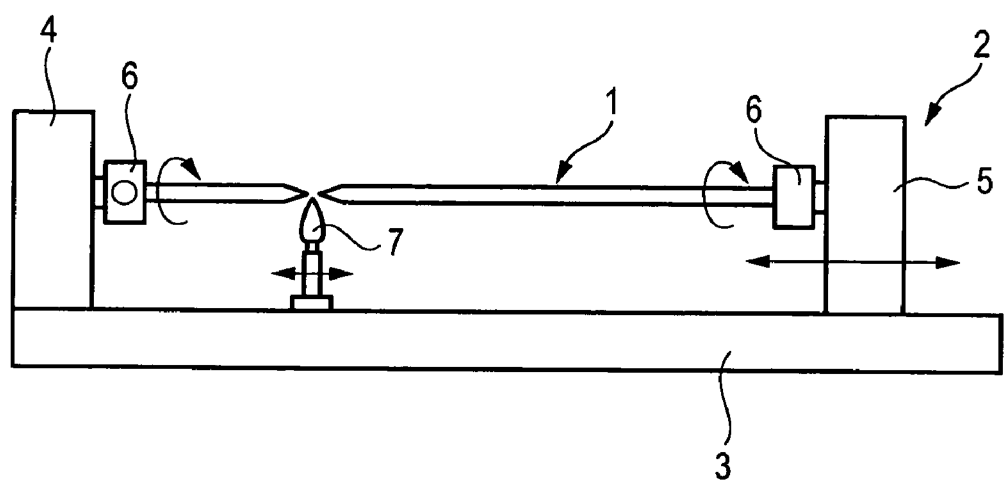
FIG. 5 is a view for explaining a conventional constitution.

FIG. 4 is a view showing another embodiment of the invention. In this embodiment, the supporting units 18 are disposed on both sides of the parting position of the glass rod 11. If the glass rod 11 is longer, the two parted glass rods 11*a* and 11*b* on both the left and right sides may become long. Accordingly, because the supporting units 18 for glass rod on both the left and right sides are disposed, the glass rod is supported stably and securely.

In the previous embodiment, the glass rod is employed as the starting material in producing the glass preform for optical fiber. However, the lathe machine 12 is employed in another process for supporting the glass preform, such as when cutting a dummy glass rod from the glass preform, or when attaching a dummy glass rod to elongate the glass preform. Also, it may be employed to support the glass rod for producing the glass preform for optical fiber, and other large glass rods in the parting process.

INDUSTRIAL APPLICABILITY

As described above, with this invention, a long glass rod is supported safely and securely and processed without causing a crack or rupture. Consequently, a large glass preform for optical fiber can be produced. Also, a supporting unit for supporting the glass rod consists of a strut with a simple structure of Y-character shape, which is disposed in addition to the conventional parting apparatus, whereby the parting operation is performed simply without increasing the cost.

What is claimed is:

1. A method for parting a glass rod, comprising steps of:

grasping both ends of said glass rod;

disposing a supporting unit to support said glass rod at a predetermined position between said both ends from a lower part of said glass rod; and parting said glass rod by moving one end of said glass rod while heating said glass rod in a state where said glass rod is supported by said supporting unit, wherein the supporting unit has a sleeve that is caused to rotate by a movement of said glass rod in an axial direction of said glass rod.

2. The method for parting the glass rod according to claim 1, wherein said supporting unit is formed to have a Y-character shape, and said parting step includes a step of parting said glass rod while supporting said glass rod by a forked leg portion of said Y-character shape.

3. The method for parting the glass rod according to claim 2, wherein said forked leg portion of the Y-character shape for said supporting unit has a carbon sleeve disposed rotatably, in which said glass rod is supported by said carbon sleeve.

4. The method for parting the glass rod according to claim 3, wherein said carbon sleeve has a cylindrical body that is rotatable around each of two leg portions making up said forked leg portion as an axis, and at said parting step, said carbon sleeve is caused to rotate along with an axial movement of said glass rod.

5. The method for parting the glass rod according to claim 1, wherein a step of disposing said supporting unit includes a step of deciding the position of said supporting unit while adjusting it in an axial direction of said glass rod.

6. The method for parting the glass rod according to claim 1, wherein said step of disposing said supporting unit includes a step of disposing two supporting units by deciding the positions of said supporting units while adjusting them in an axial direction of said glass rod, and said parting step includes a step of parting said glass rod between said two supporting units.

7. An apparatus for parting a glass rod, comprising:

grasping means for grasping both ends of said glass rod;

a supporting unit for supporting said glass rod at at least two points, the position of said supporting unit being adjustable in a longitudinal direction of said glass rod and wherein the supporting unit has a sleeve that is caused to rotate by a movement of said glass rod in an axial direction of said glass rod; and parting means for parting said glass rod while heating it.

8. The apparatus for parting the glass rod according to claim 7, wherein said supporting unit has a Y-character shape, and supports said glass rod by a forked leg portion of said Y-character shape.

9. The apparatus for parting the glass rod according to claim 8, wherein said forked leg portion of the Y-character shape for said supporting unit has a carbon sleeve disposed rotatably, in which said glass rod is supported by said carbon sleeve.

10. The apparatus for parting the glass rod according to claim 9, wherein said carbon sleeve has a cylindrical body that is rotatable around each of two leg portions making up said forked leg portion as an axis, and said carbon sleeve is formed to be rotatable along with an axial movement of said glass rod.

11. The apparatus for parting the glass rod according to claim 7, wherein said supporting unit includes two pairs of supporting units disposed on both sides of the parting position of said glass rod.

12. An apparatus for parting a glass rod, comprising:

grasping units for grasping each end of said glass rod;

a supporting unit for supporting said glass rod at at least two points, the position of said supporting unit being adjustable in a longitudinal direction of said glass rod and wherein the supporting unit has a sleeve that is caused to rotate by a movement of said glass rod in an axial direction of said glass rod; and a parting unit for parting said glass rod while heating said glass rod.

13. The apparatus for parting the glass rod according to claim 12, wherein said supporting unit has a Y-character shape with a forked leg portion, and supports said glass rod by the forked leg portion.

14. The apparatus for parting the glass rod according to claim 13, wherein said forked leg portion has a carbon sleeve disposed rotatably, in which said glass rod is supported by said carbon sleeve.

15. The apparatus for parting the glass rod according to claim 14, wherein said carbon sleeve has a cylindrical body that is rotatable around each of two leg portions making up said forked leg portion as an axis, and said carbon sleeve is formed to be rotatable along with an axial movement of said glass rod.

16. The apparatus for parting the glass rod according to claim 12, wherein said supporting unit includes two pairs of supporting units disposed on both sides of the parting position of said glass rod.

* * * * *